V. E. FISHER.
WIND SHIELD HINGE.
APPLICATION FILED SEPT. 2, 1919.

1,331,252.

Patented Feb. 17, 1920.

Inventor
Van E. Fisher
By Edward N. Pagelsen
Attorney

UNITED STATES PATENT OFFICE.

VAN E. FISHER, OF DETROIT, MICHIGAN.

WIND-SHIELD HINGE.

1,331,252. Specification of Letters Patent. Patented Feb. 17, 1920.

Application filed September 2, 1919. Serial No. 321,022.

*To all whom it may concern:*

Be it known that I, VAN E. FISHER, a citizen of the United States, and residing at Detroit, in the county of Wayne and State of Michigan, have invented a new and Improved Wind-Shield Hinge, of which the following is a specification.

This invention relates to hinges between two sections of windshields of motor vehicles, and its object is to provide a new and useful controlling mechanism for regulating the tension between the two members of the hinge.

This invention consists in combination with the two parts of a windshield hinge having interengaging portions, of a bolt for securing the two parts together, a spring on the bolt for pressing the two parts against each other, a nut on the bolt, and a connecting link, commonly known as a snap loop, between the nut and the adjacent section of the hinge, said nut and snap loop having interengaging ratchet portions which prevent the turning back of the nut.

Figure 1:
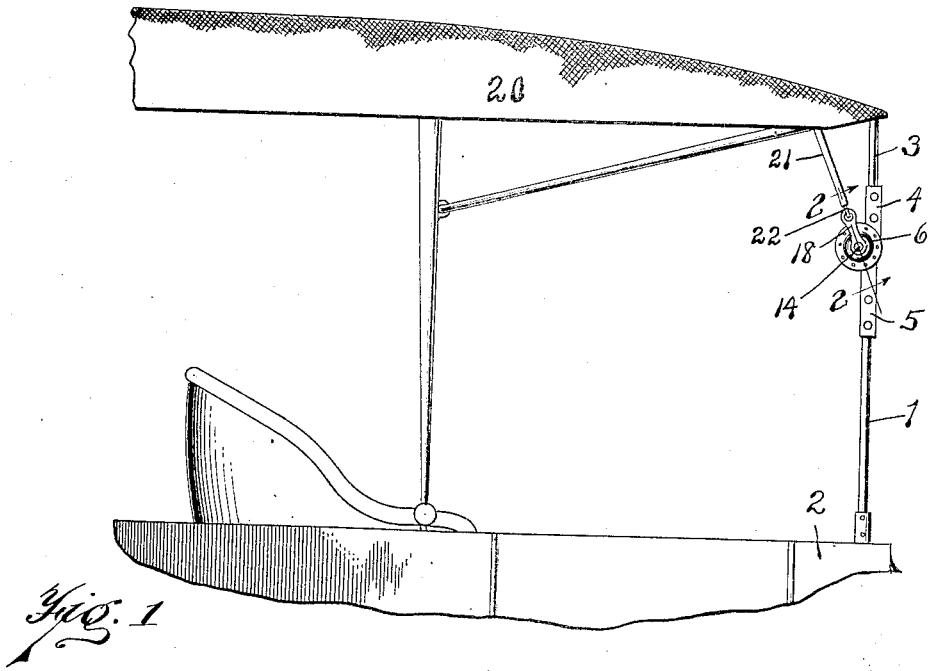
Figures 2, 3, 4:
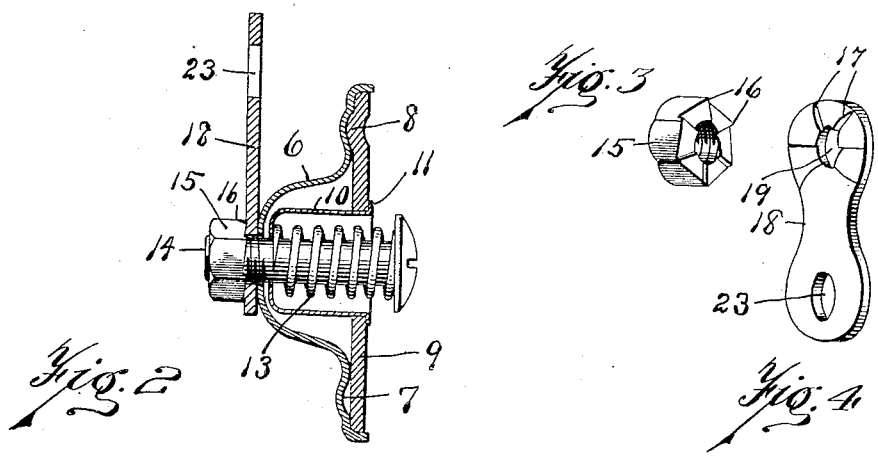

In the accompanying drawings, Figure 1 is an elevation showing the construction of the windshield hinge. Fig. 2 is a section on the line 2—2 of Fig. 1. Fig. 3 is a perspective of a nut adapted to be used with the snap loop shown in Fig. 4.

Similar reference characters refer to like parts throughout the several views.

In many automobiles the lower panel 1 of the windshield is stationary on the body 2 and the upper panel 3 is hinged to the lower panel along a horizontal axis so it can be swung down against the lower panel. The hinges which connect the two panels are formed of the two parts 4 and 5 which are directly attached to the frames of the two panels 1 and 3, and one of the sections comprises a cup-shaped part 6 formed with depressions or indentations 7 which are adapted to receive the small projection or button 8 on the part 9 of the other section of the hinge. A thimble 10 having a flange 11 extends through a central hole in the part 9 and within this thimble is mounted a spring 13 on a bolt 14. In ordinary construction this bolt is formed with a transverse hole while the nut is castellated and is held in the desired position by means of a cotter pin. The expense of drilling the hole in the pins, castellating the nuts, supplying the cotter pins and inserting them amounts to about eight cents per vehicle, and about three thousand automobiles are thus equipped daily.

In the present invention, the bolt is not drilled and no cotter pin is needed to secure the nut in position. The nut 15 on this bolt is shown in Fig. 3 as having ratchet teeth 16 which are adapted to engage the notches 17 in the snap loop 18 which is formed with a hole 19 so it can be slipped onto the bolt 14. The interengaging parts of the nuts and snap loop may be formed at very slight expense at the time these parts are manufactured. Extending down from the top 20 of the automobile is a strap 21 which has a snap hook 22 of any desired construction in its lower end which hook snaps into the hole 23 in the upper end of the snap loop 18.

When the parts are assembled as shown in Figs. 1 and 2, the nut 15 is turned down on the bolt 14 until the desired tension of the spring 13 is obtained. This will force the buttons 8 into the depressions 7 in the part 6 and prevent the panel 3 of the windshield from swinging up or down from the selected position except under considerable pressure. The tension of this spring 13 can be greatly increased by turning down the nut 15 but should it be desired to decrease this tension, the hook 22 must be disengaged so as to permit the snap loop 18 and the nut 15 to be turned back together. After the nut has been turned back a sufficient distance, the hook 22 is again engaged in the hole 23 and all the parts are thereby locked in the desired positions.

I claim:—

1. The combination with the two sections of a wind shield hinge, of a thimble extending through an opening in one of said sections, a spring mounted on said thimble, a bolt extending through said spring in said thimble and through a hole in the second section of the hinge, a link mounted on said bolt, a nut on said bolt, said nut and said link having interengaging portions to prevent said nut from being turned back on the link, and means for connecting the link to an automobile top and for holding said top and preventing the rotation of the link on said bolt.

2. A hinge for wind shield comprising two sections in engagement with each other, a bolt constituting the pivot of said hinge, a spring on said bolt to press the two sections together, a nut on the end of said bolt and a retaining member on the bolt inside of the nut, said retaining member and said nut having interengaging parts which prevent the nut from being unscrewed, and detachable top holding means adapted to be connected to an automobile top and retaining member for preventing the retaining member from turning with the nut, whereby said retaining member when disengaged from said detachable means can rotate on said bolt and unscrew the nut thereby decreasing the compression of the spring.

VAN E. FISHER.